US012770061B2

(12) United States Patent
Joblin et al.

(10) Patent No.: US 12,770,061 B2
(45) Date of Patent: Oct. 20, 2026

(54) METHOD AND SYSTEM FOR DETECTING SENSOR ANOMALIES

(71) Applicant: Siemens Aktiengesellschaft, Munich (DE)

(72) Inventors: Mitchell Joblin, Surrey (CA); Dianna Yee, Vancouver (CA)

(73) Assignee: Siemens Aktiengesellschaft, Munich (DE)

( * ) Notice: Subject to any disclaimer, the term of this patent is extended or adjusted under 35 U.S.C. 154(b) by 734 days.

(21) Appl. No.: 18/198,935

(22) Filed: May 18, 2023

(65) Prior Publication Data

US 2023/0385691 A1 Nov. 30, 2023

(30) Foreign Application Priority Data

May 31, 2022 (EP) .................................... 22176499

(51) Int. Cl.
*G06F 16/901* (2019.01)
*G06N 20/00* (2019.01)

(52) U.S. Cl.
CPC ......... *G06N 20/00* (2019.01); *G06F 16/9024* (2019.01); *G06F 16/9027* (2019.01)

(58) Field of Classification Search
CPC ............. G06F 16/9024; G06F 16/9027; G06F 18/2433; G06N 20/00; G05B 2219/25428; G05B 23/024
See application file for complete search history.

(56) References Cited

U.S. PATENT DOCUMENTS

| | | | | | |
|---|---|---|---|---|---|
| 8,364,517 | B2 * | 1/2013 | Trovero | G06Q 30/0202 705/7.29 |
| 11,307,570 | B2 * | 4/2022 | Trinh | G06N 3/045 |
| 2020/0082245 | A1 | 3/2020 | Hao et al. | |
| 2020/0104639 | A1 * | 4/2020 | Didari | G06N 3/045 |

(Continued)

FOREIGN PATENT DOCUMENTS

| | | | |
|---|---|---|---|
| CN | 114386521 | A | 4/2022 |
| EP | 4286970 | A1 | 12/2023 |
| WO | WO 2020046261 | A1 | 3/2020 |

OTHER PUBLICATIONS https://otexts.com/fpp2/hierarchical.html: Hyndman, R.J., & Athanasopoulos, G. (2018): “Forecasting: principles and practice”, 2nd edition, OTexts: Melbourne, Australia, Chapter 10, available on the internet at https://otexts.com/fpp2/ retrieved on May 31, 2022.

*Primary Examiner* — Beau D Spratt
(74) *Attorney, Agent, or Firm* — Schmeiser Olsen PLLC

(57) ABSTRACT

For detecting sensor anomalies, a machine learning model models a material flow in an industrial system, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes. The machine learning model forecasts predicted time series values for all nodes. Current sensor measurements received from sensors placed in the industrial system are compared to the predictions of the machine learning model. An anomaly is detected if the difference exceeds a threshold.

9 Claims, 4 Drawing Sheets

Algorithm 1 Example training procedure of GReP

Input: $[(x^T_{t_i}, y^T_{t_i+h})]$ $\forall t_i$ $0 \leq t_i < T$, S, $N_{epochs}$
Step 0: Initialize trainable parameters:
  J weight matrices $[W_j]$; $\forall_j$, $0 \leq j < J$
  Note $W_{J-2}$ is of n units, and $P_0 \equiv W_{J-1}$ is of m units
repeat
 Step 1: Create B mini-batches of $[(x_{b_j}, y_{b_j},)]$ from $[(x^T_{t_i}, y^T_{t_i+h})]$
 Step 2: Train model iterating through mini-batches
 for each batch $b_j$ in B do
  Step 2a: Initialize $x_0 \leftarrow x_{b_j}$
  Step 2b: Apply weight matrices and activations
  for j = 0 to J do
   if $j \neq J - 1$ then
    Assign $x_{j+1} \leftarrow$ Activation $(x_j W_j)$
   else
    Assign $x_{j+1} \leftarrow$ Activation $(x_j (S^* W_j))$
   end if
  end for
  Step 2c: Compute coherent forecasts:
   $\hat{y}_{b_j} = x_J S^T$
  Step 2d: Compute batch loss: $l_{b_j} \leftarrow Loss(y_{b_j}, \hat{y}_{b_j})$
  Step 2e: Back-Prop. of losses $[l_{b_j}]$ to update $[W_j]$
 end for
until $N_{epochs}$ reached

(56) References Cited

U.S. PATENT DOCUMENTS

| | | | |
|---|---|---|---|
| 2020/0379454 | A1 | 12/2020 | Trinh et al. |
| 2021/0182693 | A1 | 6/2021 | Herlocker et al. |
| 2021/0272027 | A1* | 9/2021 | Haji Soleimani .. G06Q 30/0201 |
| 2022/0092294 | A1* | 3/2022 | Xu ........................ G06V 40/171 |
| 2022/0375211 | A1* | 11/2022 | Tolstikhin .............. G06V 10/82 |
| 2023/0385691 | A1 | 11/2023 | Joblin et al. |

* cited by examiner

FIG 4

Algorithm 1 Example training procedure of GReP

Input: $[(x_{t_i}^T, y_{t_i+h}^T)]$ $\forall t_i$ $0 \leq t_i < T$, S, $N_{epochs}$
Step 0: Initialize trainable parameters:
  J weight matrices $[W_j]$; $\forall_j$, $0 \leq j < J$
  Note $W_{J-2}$ is of n units, and $P_0 \equiv W_{J-1}$ is of m units
repeat
  Step 1: Create B mini-batches of $[(x_{b_i}, y_{b_i},)]$ from $[(x_{t_i}^T, y_{t_i+h}^T)]$
  Step 2: Train model iterating through mini-batches
  for each batch $b_i$ in B do
    Step 2a: Initialize $x_0 \leftarrow x_{b_i}$
    Step 2b: Apply weight matrices and activations
    for j = 0 to J do
      if $j \neq J - 1$ then
        Assign $x_{j+1} \leftarrow$ Activation $(x_j W_j)$
      else
        Assign $x_{j+1} \leftarrow$ Activation $(x_j (S^*W_j))$
      end if
    end for
    Step 2c: Compute coherent forecasts:
      $\hat{y}_{b_i} = x_J S^T$
    Step 2d: Compute batch loss: $l_{b_i} \leftarrow \text{Loss}(y_{b_i}, \hat{y}_{b_i})$
    Step 2e: Back-Prop. of losses $[l_{b_i}]$ to update $[W_j]$
  end for
until $N_{epochs}$ reached

METHOD AND SYSTEM FOR DETECTING SENSOR ANOMALIES

CROSS-REFERENCE TO RELATED APPLICATIONS

This application claims priority to EP Application No. 22176499.6, having a filing date of May 31, 2023, the entire contents of which are hereby incorporated by reference.

FIELD OF TECHNOLOGY

The following relates to a method and system for detecting sensor anomalies.

BACKGROUND

To reliably operate complex systems such as automated factories, plants, or electrical grids, operators rely heavily on sensor readings to understand whether the system is operating correctly. The appearance of incorrect operation can result from failures in the system or failures in the sensor to report accurate values. Developing a machine learning algorithm to automatically detect undesirable operating behavior is often difficult because it is rare to obtain labelled data for this task. For this reason, algorithms for detecting undesirable operating behavior typically formulate the problem as anomaly detection. While this approach is convenient since it requires no labelled data, users typically find that the resulting algorithms frequently indicate anomalies are present even when the system is in fact behaving normally (i.e., high false positive rate).

In the state of the conventional art, historical data from sensors are used to establish a "normal" model of system behavior. Often simple parametric models like Gaussian distributions are used. Based on historical data a mean and variance is learned. Any sensor observation deviating significantly (more than 3 standard deviations) is flagged as an anomaly.

SUMMARY

An aspect relates to a method and system for detecting sensor anomalies that provide an alternative to the state of the conventional art.

According to embodiments of the method for detecting sensor anomalies, the following operations are performed by components, wherein the components are software components executed by one or more processors and/or hardware components:

- forecasting, by a machine learning model,
  - wherein the machine learning model models a material flow in an industrial system, in particular in a production line, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes,
- predicted time series values for all nodes,
- receiving current sensor measurements from sensors placed in the industrial system,
- extracting observed time series values for at least some or all of the nodes from the current sensor measurements,

- computing a difference between the predicted time series values and the observed time series values, and
- detecting an anomaly if the difference exceeds a threshold.

The system for detecting sensor anomalies comprises:

- a machine learning model, wherein the machine learning model models a material flow in an industrial system, in particular in a production line, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes, and
- wherein the machine learning model is trained for forecasting predicted time series values for all nodes,
- an interface, configured for receiving current sensor measurements from sensors placed in the industrial system, and
- one or more processors, configured for
  - extracting observed time series values for at least some or all of the nodes from the current sensor measurements,
  - computing a difference between the predicted time series values and the observed time series values, and
  - detecting an anomaly if the difference exceeds a threshold.

The following advantages and explanations are not necessarily the result of the object of the independent claims. Rather, they may be advantages and explanations that only apply to certain embodiments or variants.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices, or any other communication devices that can process data with computer support, processors, and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

In an embodiment, the method and system, improve the performance of sensor anomaly detection by incorporating additional domain knowledge about the structure of the system in the form of relational constraints.

In an embodiment, the method and system, reduce the prediction error for anomaly detection in problems involving material flow (lower false positive rate).

In an embodiment, the method and system, provide increased training efficiency by leveraging domain knowledge.

In an embodiment, the method and system, require less data to achieve a highly performant model.

In an embodiment, the method and system, help to guarantee that model predictions are consistent with physical laws (satisfy aggregation constraints).

In an embodiment, the method and system, increase trustworthiness and ease of use in adopting AI-based algorithms.

In an embodiment, the method and system, reduce costs that are associated with false or missed anomalies.

In an embodiment of the method and system, the extracting operation is performed by a material flow tracking system that is processing the sensor measurements.

In an embodiment of the method and system, the machine learning processes previous sensor measurements when executing the forecasting operation.

An embodiment of the method comprises the additional operation of automatically halting at least a part of the industrial system after detecting the anomaly.

An embodiment of the method comprises the additional operation of outputting, by a user interface, an alert to an operator after detecting the anomaly.

In an embodiment of the method and system, the machine learning model has been initially trained by a Gradient-based Reconciling Propagation algorithm in order to learn trainable parameters of a projection matrix, wherein the projection matrix is used to project base forecasts to coherent forecasts in a hierarchically-coherent solution space, and wherein the coherent forecasts contain the predicted time series values.

In an embodiment of the method and system, the Gradient-based Reconciling Propagation algorithm ensures that information propagation between forecasts is restricted to nodes who are connected through an ancestral and descendant relation, by masking entities of the projection matrix by a second matrix, thereby constraining the effects of the projection matrix.

A computer program product (non-transitory computer readable storage medium having instructions, which when executed by a processor, perform actions) has program instructions for carrying out the method.

The provision device for the computer program product stores and/or provides the computer program product.

BRIEF DESCRIPTION

Some of the embodiments will be described in detail, with reference to the following figures, wherein like designations denote like members, wherein:

FIG. 4 shows a training algorithm; and

DETAILED DESCRIPTION

In the following description, various aspects of embodiments of the present invention and embodiments thereof will be described. However, it will be understood by those skilled in the conventional art that embodiments may be practiced with only some or all aspects thereof. For purposes of explanation, specific numbers and configurations are set forth in order to provide a thorough understanding. However, it will also be apparent to those skilled in the conventional art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

Figure 1:
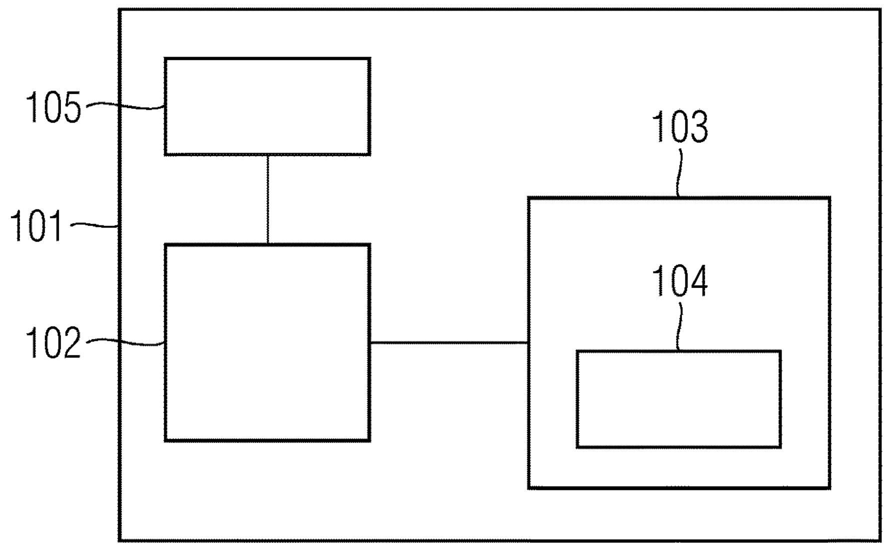
FIG. 1 shows one sample structure for computer-implementation of embodiments of the invention.

FIG. 1 shows one sample structure for computer-implementation of embodiments of the invention which comprise:

(101) computer system
(102) processor
(103) memory
(104) computer program (product)
(105) user interface In this embodiment of the invention the computer program product 104 comprises program instructions for carrying out embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of invention may be presented on the user interface 105. Alternatively, they may be stored in the memory 103 or on another suitable means for storing data.

Figure 2:
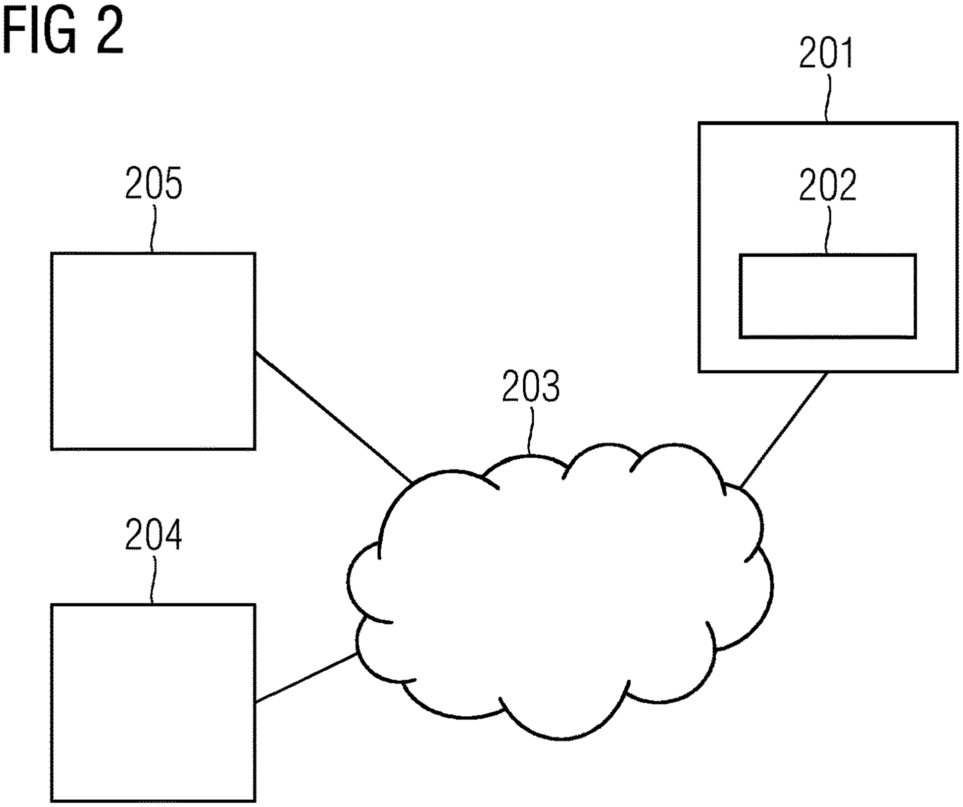
FIG. 2 shows another sample structure for computer-implementation of embodiments of the invention.

FIG. 2 shows another sample structure for computer-implementation of embodiments of the invention which comprise:

(201) provisioning device
(202) computer program (product)
(203) computer network/Internet
(204) computer system
(205) mobile device/smartphone In this embodiment the provisioning device 201 stores a computer program 202 which comprises program instructions for carrying out the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

Figure 3:
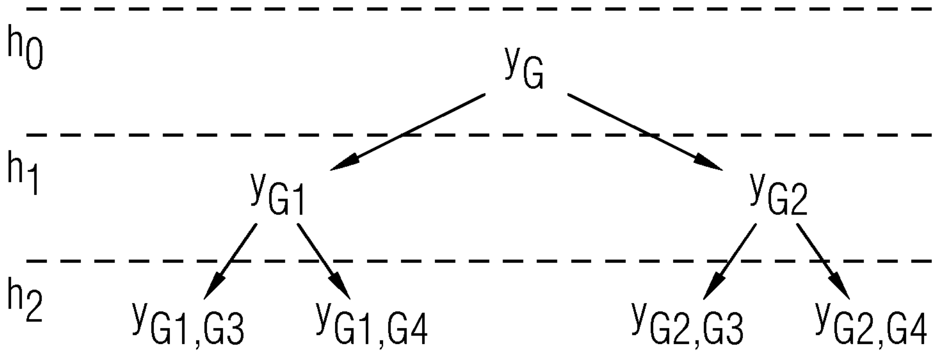
FIG. 3 shows a tree representing material flow in an industrial system.
Figure 5:
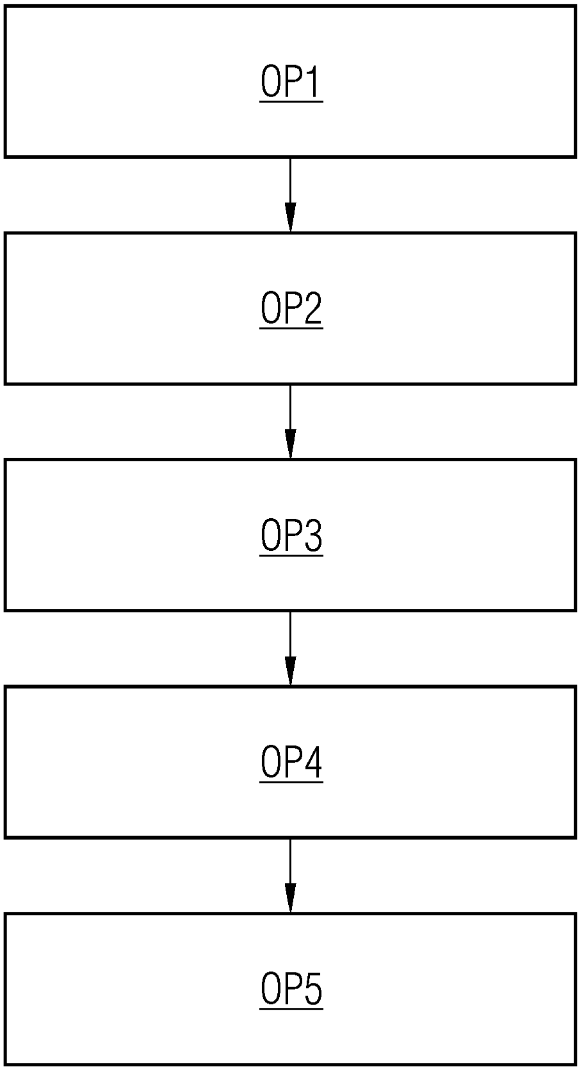
FIG. 5 shows a flowchart of a possible exemplary embodiment of a method for detecting sensor anomalies.

The embodiments shown in FIGS. 3 to 5 can be implemented with a structure as shown in FIG. 1 or FIG. 2.

Hierarchical time series as well as grouped time series and corresponding algorithms for forecasting are known, for example, from Hyndman, R. J., & Athanasopoulos, G. (2018): "Forecasting: principles and practice", 2nd edition, OTexts: Melbourne, Australia, chapter 10, available on the internet at https://otexts.com/fpp2/ on 31 May 2022. The entire contents of that document are incorporated herein by reference.

The following embodiments are targeting applications where material flow is present. For example, material flows through a factory according to input to the production line to produce products that are assembled and eventually flow out of various production phases. More concretely, if four wheels flow into an automobile production phase for wheel assembly, then a car with four wheels will flow out. Similarly, in electrical circuits physical laws require that the total current flowing into a node is equal to the total current flowing out of a node. In problems involving flow, the embodiments leverage the known structure of the material flow to impose additional knowledge on an anomaly detection system and achieve improved performance.

FIG. 3 shows a tree that illustrates the material flow. Each level of the tree represents different nodes in a material flow problem. At the lowest level the nodes can represent a final phase of a production process. Material flowing to child nodes must equal material flowing through the parent nodes.

Another example would be an assembly line where weight sensors measure the weight of a first, second, third and fourth component that are entering the assembly line. The measurements of these weight sensors provide the time series values at the lowest level of the nodes in FIG. 3. The first and second components are assembled at a first manufacturing station, resulting in a first assembly, and the third and fourth component are assembled at a second manufacturing station, resulting in a second assembly. Sensors capture the weight of the first and second assembly at the respective stations and provide the time series values at the middle level of the nodes in FIG. 3. Finally, the first assembly and second assembly are combined to form a final product. Another sensor measures the weight of the final product and provides the time series value for the top node of the tree shown in FIG. 3.

As modern manufacturing systems can be very complex, other embodiments can feed raw sensor measurements into a material flow tracking system that analyzes and/or simulates material flow in the manufacturing system. Material flow tracking systems are known from the state of the conventional art, for example from the field of material flow analysis, and are also available as readily deployable commercial products. The hierarchical times series values for the different nodes in FIG. 3 are then provided by the material flow tracking system.

At a high level, the idea is to use the structural knowledge of an industrial system (in terms of relational information) to train a machine learning model. The machine learning model is responsible for predicting what the sensor readings should be if the industrial system is working correctly. In essence, the machine learning model represents the expected normal industrial system behavior. We can then compare the expected sensor values with actual sensor values (e.g., by taking the absolute difference). A significant deviation (i.e., large residual value) indicates that the industrial system is behaving abnormally.

Hierarchical relations among time-series sensor data can be represented as a tree, a directed acyclic graph $G \in \{V, E\}$ where V is the set nodes of the graph where each node is associated to a time-series. The cardinality of the set $|V|=n$ is the number of time-series to forecast. The set of edges $E \in V \times V$ represent parent-child relations where the value of the times-series at a parent node equals the sum of values of all child nodes.

Let $y_t=[y_{v_0,t}, y_{v_1,t}, \ldots, y_{v_n,t}]$ be the vector of observations of a hierarchical time series at time t where $y_{v_i}$ denotes the $i^{th}$ time-series of the hierarchical graph structure and $v_i$ is a variable whose value is the node id which uniquely identifies the node and corresponding time-series. We denote the observations of $y_t$ for all time as y. To indicate the difference between forecasts and actual observations, we use the hat operator to denote $\hat{y}_{v_i,t+h}$ as the estimated forecast of $y_{v_i,t+h}$ at h time-steps in the future, where $1 \leq h \leq H$, and H denotes the forecast horizon.

Let $y_{B_t} \in \mathbb{R}^m$ denote a vector that contains values of all time-series which are leaf nodes at time t, also referred to as the bottom time-series. The vector $y_{A_t} \in \mathbb{R}^{n-m}$, contains values of all time-series that are parent nodes of the nodes in $y_{B_t}$. The aggregations of values within $y_B$ is related to y by an aggregation matrix $S \in \{0,1\}^{n \times m}$ by $$y_t = S y_{\mathcal{B},t} \Leftrightarrow \begin{bmatrix} y_{\mathcal{A},t} \\ y_{\mathcal{B},t} \end{bmatrix} = \begin{bmatrix} S_{sum} \\ I_m \end{bmatrix} y_{\mathcal{B},t}.$$

where $I_m$ is the m×m dimensional identity matrix and $S_{sum} \in \{0,1\}$ is the summation matrix where the values of $i^{th}$ row of $S_{sum}$ indicate which values in $y_{B,t}$ to aggregate to define the $i^{th}$ value of $y_{A,t}$. For the hierarchical time-series example in FIG. 3, the aggregation matrix S is defined as $$S = \begin{bmatrix} 1 & 1 & 1 & 1 \\ 1 & 1 & 0 & 0 \\ 0 & 0 & 1 & 1 \\ & I_4 & & \end{bmatrix}.$$

For the grouped time-series setting with groupings shown in FIG. 3, where $y_A=\{y_G, y_{G1}, y_{G2}, y_{G3}, y_{Gf}\}$, S is defined as $$S = \begin{bmatrix} 1 & 1 & 1 & 1 \\ 1 & 1 & 0 & 0 \\ 0 & 0 & 1 & 1 \\ 1 & 0 & 1 & 0 \\ 0 & 1 & 0 & 1 \\ & I_4 & & \end{bmatrix}$$

Historically, the reconciliation of forecasts is commonly addressed by applying post-processing to the base forecasts. To distinguish between the reconciled forecasts and base forecasts, we denote the base forecasts with the tilde accent where $\hat{y}_{t+h}$ is the reconciled forecasts from the base forecasts $\tilde{y}_{t+h}$. Previous work has shown that $\tilde{y}_{t+h}$ can be reconciled by the following matrix multiplications $$\hat{y}_{t+h}=SP\tilde{y}_{i+h}$$

where $P \in \mathbb{R}^{m \times n}$ and its values determine the propagation of the time-series through aggregations or dis-aggregations. The reconciliation transformation can be viewed as a projection matrix, where reconciliation from all levels can be applied through the matrix multiplications of the matrix, $SP \in \mathbb{R}^{2 \times n}$.

The embodiment uses a Gradient-based Reconciling Propagation method which aims to learn the values of a projection matrix $P_o$, which is a matrix of trainable parameters that projects the base forecasts into a hierarchically-coherent solution space. The resulting coherent forecasts are defined as $$\hat{y}_{t+h}=S(S^T * P_o)\tilde{y}_{t+h},$$

where * denotes an element-wise multiplication and $\tilde{y}_{t+h}$ is a vector of n dimensions. As this equation is differentiable, it is therefore possible to use a gradient-based approach to learn the values of $P_o$ which minimizes forecast error. This approach can either be used as a post-processing step to reconcile a set of base forecasts or integrated into a neural network architecture as the output layer to yield coherent forecasts, meaning $\tilde{y}_{t+h}$ can either be a set of base forecasts or the outputs of a hidden layer of n dimensions. The element-wise multiplication of ($S^T$*$P_o$) ensures that the information propagation between forecasts is restricted to nodes who are connected through an ancestral and descendant relation.

The training algorithm depicted in FIG. 4 shows an example procedure for training the machine learning model by learning the parameters of $P_o$. In the case where the embodiment is used as a post-processing step, the input features $x_{t_i}$ to provide to the algorithm would be the base-forecasts $\tilde{y}_{t_i+h}$. The currently described embodiment differs from previous approaches since the embodiment can be designed to be non-linear. In the case where one would want to use the embodiment for end-to-end training, $x_{t_i}$ would be the input features for the forecasting task such as auto-regressive and exogenous features.

The machine learning model is trained on historical sensor data to learn the normal behavior of the industrial system by a forecasting task. The training data can be obtained by recording sensor values which are known to be anomaly free. A second option is to utilize historical data that may contain anomalies, but the anomaly frequency must be low (e.g., less than 1%).

Once the machine learning model has been trained, sensor data can be fed to the machine learning model to produce a prediction about what normal sensor readings should look like. By subtracting the observed sensor readings from the predicted sensor readings, a residual value is computed. A large residual value indicates that the industrial system is operating in an anomalous state.

If the algorithm depicted in FIG. 4 predicts that an anomaly is likely present, then it can be used to either notify a human operator or be fed directly into a control system (closed loop control). In the close loop control setting, an anomaly may trigger the industrial system to halt in order to prevent material losses due to incorrect operation.

FIG. 5 shows a flowchart of a possible exemplary embodiment of a method for detecting sensor anomalies.

In a forecasting operation OP1, a machine learning model, wherein the machine learning model models a material flow in an industrial system, in particular in a production line, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes, predicts time series values for all nodes.

In a receiving operation OP2, current sensor measurements from sensors placed in the industrial system are received.

In an extracting operation OP3, observed time series values for at least some or all of the nodes are extracted from the current sensor measurements.

In a computing operation OP4, a difference between the predicted time series values and the observed time series values is computed.

In a detecting operation OP5, an anomaly is detected if the difference exceeds a threshold.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud. The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code, and the like, operating alone or in combination. Likewise, processing strategies may include multiprocessing, multitasking, parallel processing, and the like.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

The invention claimed is:

1. A computer implemented method for detecting sensor anomalies, comprising the following operations, wherein the operations are performed by components, and wherein the components are software components executed by one or more processors and/or hardware components:

forecasting, by a machine learning model, predicted time series values for all nodes, wherein the machine learning model models a material flow in an industrial system, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes, receiving current sensor measurements from sensors placed in the industrial system, extracting observed time series values for at least some or all of the nodes from the current sensor measurements, computing a difference between the predicted time series values and the observed time series values, and detecting an anomaly if the difference exceeds a threshold, wherein the machine learning model has been initially trained by a Gradient-based Reconciling Propagation algorithm in order to learn trainable parameters of a projection matrix, wherein the projection matrix is used to project base forecasts to coherent forecasts in a hierarchically-coherent solution space, and wherein the coherent forecasts contain the predicted time series values.

2. The method according to claim 1, wherein the extracting operation is performed by a material flow tracking system that is processing the sensor measurements.

3. The method according to claim 1, wherein the machine learning processes previous sensor measurements when executing the forecasting operation.

4. The method according to claim 1, with the additional operation of automatically halting at least a part of the industrial system after detecting the anomaly.

5. The method according to claim 1, with the additional operation of outputting, by a user interface, an alert to an operator after detecting the anomaly.

6. The method according to claim 1, wherein the Gradient-based Reconciling Propagation algorithm ensures that information propagation between forecasts is restricted to nodes who are connected through an ancestral and descendant relation, by masking entities of the projection matrix by a second matrix, thereby constraining the effects of the projection matrix.

7. A computer program product, comprising a non-transitory computer readable hardware storage device having computer readable program code stored therein, said program code executable by a processor of a computer system to implement a method with program instructions for carrying out a method according to claim 1.

8. A provision device for the computer program product according to claim 7, wherein the provision device stores and/or provides the computer program product.

9. A system for detecting sensor anomalies, comprising:

a machine learning model, wherein the machine learning model models a material flow in an industrial system, as a hierarchical time series, wherein the hierarchical time series represents a structure of the material flow using a directed acyclic graph with a set of nodes and a set of edges, wherein each node is associated to a time series, and wherein the edges represent parent-child relations where each value of a time series at a parent node equals the sum of the respective values of its child nodes, and wherein the machine learning model is trained for forecasting predicted time series values for all nodes, an interface, configured for receiving current sensor measurements from sensors placed in the industrial system, and one or more processors, configured for extracting observed time series values for at least some or all of the nodes from the current sensor measurements, computing a difference between the predicted time series values and the observed time series values, and detecting an anomaly if the difference exceeds a threshold, wherein the machine learning model has been initially trained by a Gradient-based Reconciling Propagation algorithm in order to learn trainable parameters of a projection matrix, wherein the projection matrix is used to project base forecasts to coherent forecasts in a hierarchically-coherent solution space, and wherein the coherent forecasts contain the predicted time series values.

* * * * *